United States Patent [19]
Skufca et al.

[11] Patent Number: 5,558,887
[45] Date of Patent: Sep. 24, 1996

[54] MOLD APPARATUS FOR HELICAL ARTICLES

[75] Inventors: James Skufca, Lakewood; Matthew R. Skufca, Jr., Cleveland, both of Ohio

[73] Assignee: Heelix Fasteners, Inc., Cleveland, Ohio

[21] Appl. No.: 392,527

[22] Filed: Feb. 23, 1995

[51] Int. Cl.[6] .......................... B29C 33/44; B29C 45/44
[52] U.S. Cl. .......................... 425/418; 249/59; 425/438; 425/577; 425/DIG. 58
[58] Field of Search .................... 425/418, 438, 425/443, 577, DIG. 58; 249/59

[56] References Cited

U.S. PATENT DOCUMENTS

| | | | |
|---|---|---|---|
| 2,217,661 | 10/1940 | Anderson | 425/438 |
| 2,984,862 | 5/1961 | Chabotte | 425/438 |
| 3,481,000 | 12/1969 | Bärfuss | 425/443 |
| 3,702,087 | 11/1972 | Schmitt | 411/362 |
| 3,905,416 | 9/1975 | Hammer | 249/59 |
| 4,003,107 | 1/1977 | Klein et al. | 411/508 |
| 4,384,803 | 5/1983 | Cachia | 411/339 |
| 4,384,804 | 5/1983 | Cachia et al. | 411/339 |
| 4,693,861 | 9/1987 | Lapeyre | 264/328.1 |
| 4,797,295 | 1/1989 | Franco et al. | 264/318 |
| 4,861,208 | 8/1989 | Boundy | 411/339 |
| 4,959,007 | 9/1990 | Okuyama | 425/418 |
| 5,186,590 | 2/1993 | Oldendorf | 411/45 |
| 5,190,424 | 3/1993 | Kazino et al. | 411/171 |
| 5,383,780 | 1/1995 | McCready et al. | 425/438 |

*Primary Examiner*—Robert Davis
*Attorney, Agent, or Firm*—Fay, Sharpe, Beall, Fagan, Minnich & McKee

[57] ABSTRACT

A mold construction for allowing molding of parts having elements with a helical configuration. The helically configured portion is formed by a portion of the mold that is freely rotatable relative to the rest of the mold about the axis of the helically configured portion. The extraction of the molded component from the mold along a path coextensive with the axis of the helically configured portion produces driven rotation of the rotatable mold portion thereby releasing the molded component.

14 Claims, 1 Drawing Sheet

5,558,887

MOLD APPARATUS FOR HELICAL ARTICLES

BACKGROUND OF THE INVENTION

The subject invention is directed toward the molding art and, more particularly, to a mold apparatus for forming helically shaped components.

The invention is especially suited for use in forming an improved plastic fastener having a helically grooved stud and will be described with reference thereto; however, as will become apparent, the invention is capable of broader application and could be used for forming a variety of helically configured components.

In our copending U.S. application, Ser. No. 08/393,328, filed concurrently herewith for "Helix Fastener Assembly" there is disclosed a molded plastic fastener assembly that includes a helically grooved stud member that engages in a cylindrical bore with an interference fit.

Injection molding such helically shaped components requires relatively complex molds incorporating multiple slides and moving parts. As a consequent, the molds are expensive and sometimes result in long cycle times.

SUMMARY OF THE INVENTION

The subject invention overcomes the problems discussed above and provides a relatively inexpensive mold construction that greatly facilitates injection molding of helical configured products.

In accordance with a primary aspect of the subject invention, there is provided a mold apparatus for forming a helically shaped article and comprising a mold having a mold cavity therein. The mold cavity includes a molding surface configured to allow a part molded within the cavity to be withdrawn from the cavity in a first linear direction. A portion of the mold cavity is formed by a body having a helically grooved cylindrical surface with a central axis and with the cylindrical surface forming a portion of the molding surface. The body with the helically grooved cylindrical surface is supported by means associated with the mold for mounting the body in a manner that it can freely rotate about the central axis of the helically grooved cylindrical surface with the central axis in alignment with the first linear direction.

Because of the arrangement of the free rotational mounting of the body having the helically grooved cylindrical surface, the part formed within the mold cavity can be withdrawn from the cavity along the first linear direction and rotation imparted to the body about its central axis because of the driving forces generated by the helical surface formed on the molding part and its engagement with the helically grooved surface of the body.

As can be appreciated, the helically grooved cylindrical surface can be either an internal surface or an external surface of the body. That is, the formed element can be an externally grooved cylinder or an internally grooved cylindrical opening or bore.

In accordance with a more limited aspect of the invention, an ejector pin is mounted centrally of the helically grooved cylindrical surface of the body for selective axial movement along the central axis between a retracted and an extended, ejection position. The body is preferably also mounted for free rotation relative to the ejector pin.

In accordance with yet another aspect of the invention, the body carrying the helically grooved cylindrical surface is cylindrical and is mounted by suitable thrust bearings carried within the mold.

In its preferred form, there are a plurality of grooves in the helically grooved surface and the grooves have a positive or negative helix angle of between 45° and 90° to facilitate the imparting of rotary movement to the body by the molded component during its ejection from the mold.

As can be seen from the foregoing, a primary object of the invention is the provision of a simplified mold structure for molding components having helically grooved cylindrical surface portions.

A further object of the invention is the provision of an apparatus of the type described wherein components having helically grooved portions can be ejected from a mold without requiring that there be a variety of driven slides and the like.

A still further object of the invention is the provision of an apparatus for molding plastic components wherein either internally or externally helically grooved cylindrical surfaces can be formed with an inexpensive die construction.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
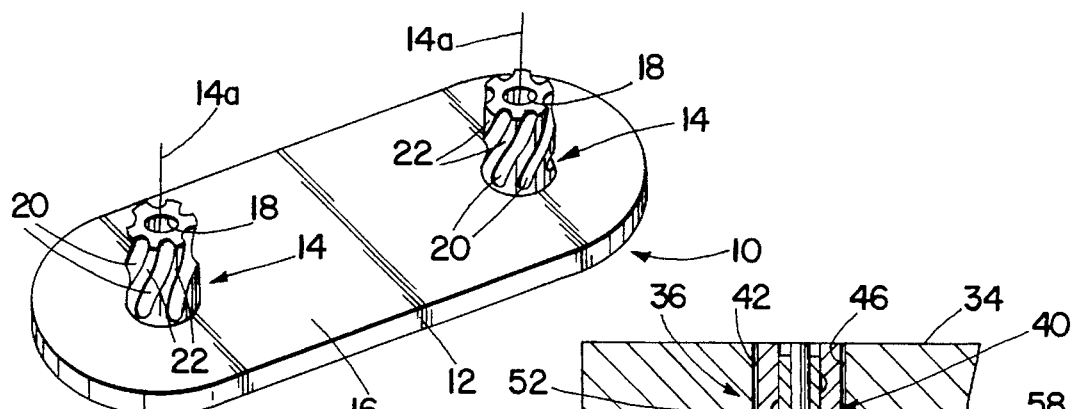
FIG. 1 is an isometric view of an injection molded plastic component incorporating helically grooved portions and representing a typical component that can be formed with a mold assembly formed in accordance with the subject invention.
Figure 3:
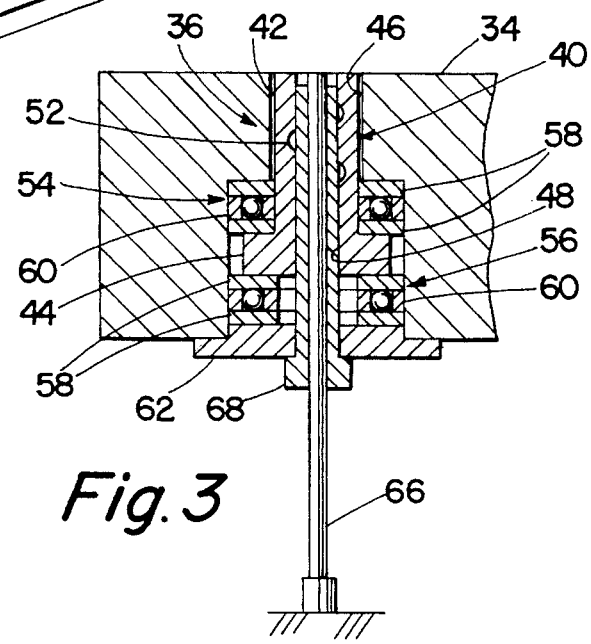

Referring now to the drawings wherein the showings are for the purposes of illustrating the preferred embodiment of the invention only and not for purposes of limiting same, FIG. 1 shows a typical injection molded plastic product of the type that can be formed using the improved mold assembly and construction of the subject invention. As generally illustrated in FIG. 1, the injection molded plastic product 10 comprises an oval shaped, relatively thin main body 12 having a pair of stud members or formations extending from the upper surface 16 in parallel relationship. Each of the stud members 14 is of generally cylindrical shape and has an axially inwardly extending opening or bore 18 formed therein. In the embodiment illustrated, the bores 18 are coaxial with the main axis 14a of each of the stud members 14. The exterior of the stud members 14 are provided with a plurality of helically extending grooves 20 located circumferentially about the exterior surface and are separated by helical ribs 22. A product of the general type shown in FIG. 1 is described and claimed as part of a fastener assembly in our copending, concurrently filed U.S. application Ser. No. 08/393,328 for "Helix Fastener Assembly".

As previously mentioned, injection mold formation of a product of the type shown in FIG. 1 has previously required relatively complex molds to allow such helically configured elements as the studs 14 to be withdrawn from the mold. Normally, the molds have required a significant number of horizontally movable slide portions to allow the helically grooved surfaces to be moved out of the mold in the direction of the axis 14a.

Figure 2:
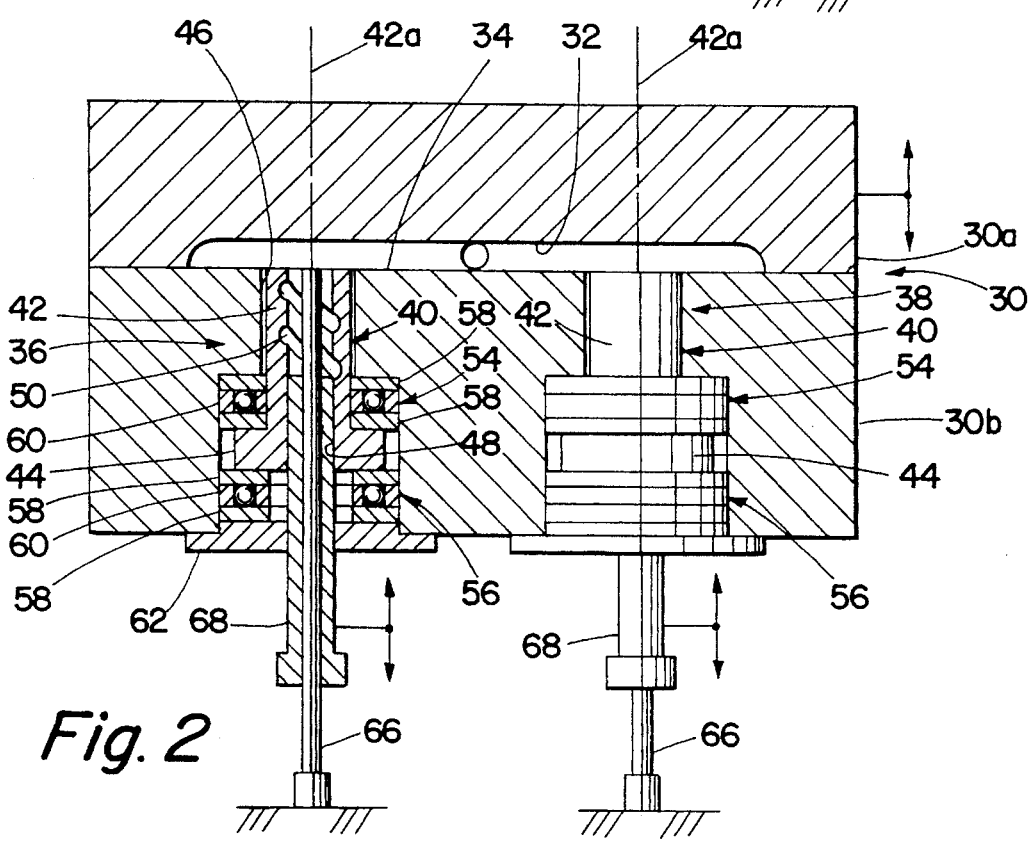
FIG. 2 is a cross-sectional view through a mold assembly capable of forming the component of FIG. 1 and incorporating a preferred embodiment of the subject invention; and, FIG. 3 is a view of the left-hand portion of FIG. 2 but showing the ejection pin portion in an extended component ejecting position.

The subject invention overcomes the mold problems attendant to the products of the type shown and allows a variety of different helically configured cylindrical surfaces to be molded readily with a simple and comparatively inexpensive mold arrangement. Referring to FIG. 2, there is shown in cross section a somewhat diagrammatic mold assembly 30 that incorporates the invention and can be used for forming the product of FIG. 1. The mold assembly 30 is shown as a two-part mold having an upper mold part 30a and a lower mold part 30b which cooperate to define a mold chamber having the configurations of the FIG. 1 product. The two mold components 30a and 30b are, of course, arranged so that they can be moved to the closed position shown wherein the part can be formed, to a separated position wherein the part can be extracted from the mold chamber defined by the two mold components. Either or both of the mold parts can, of course, be mounted for relative movement toward and away from one another to open and close mold chamber. The particular manner in which the mold parts 30a and 30b are mounted forms no particular part of the invention and any well known mounting arrangement could equally well be used. In the FIG. 2 showing, the mold is arranged to form the component with the two studs extending in a downward position as shown in FIG. 1. In particular, the mold part 30a includes an inwardly extending recessed area 32 that defines the main body portion of component 10. The lower mold part 30b cooperates therewith so that its upper surface 34 defines the surface 16 of product 10.

Carried within the mold portion 30b are two assemblies 36 and 38 which function to form the two separate stud members 14. Each of the assemblies 36, 38 are identical in construction and arrangement. The left-hand unit 36 is shown in cross section whereas the right-hand unit 38 is shown in its full exterior configuration. Each of the assemblies 36, 38 are, as previously mentioned, preferably of identical construction. Accordingly, only assembly 36 will be described in detail and the description thereof is to be taken as equally applicable to the unit 38. In particular, the assembly 36 includes a cylindrical body portion 40 which includes a reduced diameter upper portion 42 and a somewhat larger diameter lower flanged end portion 44. The upper end portion 42 is closely but rotatably received in a bore 46 that extends into the mold component 30b and joins with the mold chamber through surface 34. The axis of the opening of the cylindrical chamber or opening 46 is parallel to the direction of extraction of the molded part from the mold component 30b. Extending axially through the member 40 and coaxial with the axis 42a is a central passage 48. The upper end of passage 48 is provided with helically formed grooves 50 that are shaped and configured to form the ribs 22 and inter-spaced grooves 20 of the stud members 18. These surfaces thus form a continuation of the molding surfaces of chamber 32 and the molding surface 34. Of particular importance to the invention is the fact that the body component 40 is mounted for free relative rotation within the bore 46 about the axis 42a. Many different mounting arrangements could be used to provide this free relative rotation. In the subject invention, however, the flange portion 44 is captured between suitable thrust bearing assemblies 54 and 56 which each include a pair of hardened washers 58 and an intermediate anti-friction thrust bearing element 60. The assembly including the bearings 54, 56 and the body member 40 is retained in the position shown by an outer retainer plate 62 suitably and removably connected to the mold component 30b. Extending through the center opening 48 in member 40 is a cylindrical pin 66 that terminates generally in the same plane as surface 34. Pin 66 is suitably fixed in position and serves to form the opening 18 in the stud member 14.

Associated with pin 66 and closely received within the bore 48 is a cylindrical sleeve-like ejection pin member 68 that is mounted for free sliding movement relative to pin 66 and member 40. Thus, after the mold components 30a and 30b are moved apart, the ejection pin sleeve member 68 can be driven upwardly to force the part including the studs from the position within the mold 30b. The driving movement of the studs 14 by the ejection sleeves 68 causes the body 40 to rotate due to the driving motion imparted thereto by the grooved exterior of the stud portions 14. The free rotating body members 40 thus allow the component 10 to be extracted from the die without requiring any special slides or the like in the die.

It should, of course, be understood that the amount of helical angle that the grooves can have and still perform the driving function relative to component 40 will depend upon a variety of factors including the relative coefficient of friction between the plastic and the grooved interior of member 40. Normally, however, any helix angle greater than approximately 45° can be handled relatively easily. The closer the angle approaches 90°, however the easier it is to produce the necessary rotary motion of the body 40. Additionally, it should be understood that the helix can be either a right or a left-hand helix without any changes to the die or the general construction thereof. Note that the automatic driving which takes place between the molded studs and the body 40 will be performed irrespective of whether the helix is a left or a right-hand. In addition, the number of such helical elements provided on the part is not of significance since simultaneous movement of all of the ejection sleeve pin members 68 will perform the necessary discharge of the part from the mold. Additionally, different pieces of the same component can have different helixes without requiring any major changes to the assembly other than to change the component 40.

In addition to the above, it should be understood that although in the subject embodiment the component being formed has external helically formed surfaces, internal helixes can equally well be formed merely by changing component 40 to have an externally grooved portion that extends into the chamber 32 or beyond surface 34, for example.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A mold apparatus for forming a helically shaped article comprising:

a mold having a mold cavity therein, said cavity having a molding surface configured to allow a part molded within the cavity to be withdrawn from the cavity in a first linear direction;

a portion of the mold cavity being formed by a body with a helically grooved cylindrical surface having a central axis and forming a portion of the molding surface;

means for mounting said body for unconstrained free rotation about the central axis of the helically grooved cylindrical surface with the central axis in alignment with the first linear direction; and, further wherein the helically grooved cylindrical surface is an interior surface of the body.

2. The apparatus as defined in claim 1 including an ejection pin mounted for reciprocation in the body along the central axis.

3. The apparatus as defined in claim 1 wherein there are a plurality of grooves on the helically grooved surface with the grooves having a helix angle in the range of between 45° and 135°.

4. The apparatus as defined in claim 1 wherein the body has a central opening extending thereinto and defining the helically grooved surface.

5. The apparatus as defined in claim 1 wherein the body has a cylindrical exterior surface and the helically grooved surface is an interior surface in the body with the said central axis coextensive with the axis of the cylindrical exterior surface.

6. The apparatus as defined in claim 5 wherein the body is supported by the mold and is carried therein by anti-friction bearings.

7. The apparatus as defined in claim 5 including a cylindrical pin member extending into the body along the central axis thereof.

8. A mold apparatus for forming a product having a body with a helically configured portion extending therefrom comprising:

first housing means defining a mold chamber for forming the body of the product, the mold chamber configured to allow the body of the product to be withdrawn therefrom along a first straight path;

second housing means joined to the first housing for free rotation relative thereto about a first axis parallel to the first straight path; and, a cavity in the second housing means opening to the mold chamber and forming a continuation thereof, the cavity forming the helically configured portion and located about the first axis.

9. The mold apparatus as defined in claim 8 wherein the cavity is defined by a generally cylindrical wall with helical grooves formed therein.

10. A mold apparatus for forming a helically shaped article comprising:

a mold having a mold cavity therein, said cavity having a molding surface configured to allow a part molded within the cavity to be withdrawn from the cavity in a first linear direction;

a portion of the mold cavity being formed by a body with a helically grooved cylindrical surface having a central axis and forming a portion of the molding surface;

means for mounting said body for unconstrained free rotation about the central axis of the helically grooved cylindrical surface with the central axis in alignment with the first linear direction; and, an ejection pin mounted for reciprocation in the body along the central axis.

11. The apparatus as defined in claim 10 wherein there are a plurality of grooves on the helically grooved surface with the grooves having a helix angle in the range of between 45° and 135°.

12. The apparatus as defined in claim 10 wherein the body has a central opening extending thereinto and defining the helically grooved surface.

13. The apparatus as defined in claim 10 wherein the body has a cylindrical exterior surface and the helically grooved surface is an interior surface in the body with the said central axis coextensive with the axis of the cylindrical exterior surface.

14. The apparatus as defined in claim 13 wherein the body is supported by the mold and is carried therein by anti-friction bearings.

* * * * *